United States Patent [19]

Matlock et al.

[11] 4,000,734
[45] Jan. 4, 1977

[54] SOLAR ENERGY CONVERTER

[76] Inventors: William C. Matlock, 2123 S. Priest; Patricia K. Somlo, 2045 E. Broadway, both of Tempe, Ariz. 85282

[22] Filed: Nov. 6, 1975

[21] Appl. No.: 629,518

[52] U.S. Cl. .............................................. 126/271
[51] Int. Cl.² ....................................... F24J 3/02
[58] Field of Search .......... 126/270, 271; 237/1 A; 60/641; 350/288, 298, 299, 300

[56] References Cited

UNITED STATES PATENTS

| | | | |
|---|---|---|---|
| 2,135,997 | 11/1938 | Arthuys | 126/270 |
| 2,945,417 | 7/1960 | Caryl et al. | 126/270 |
| 3,680,307 | 8/1972 | Michalec | 126/271 |
| 3,847,136 | 11/1974 | Salvali | 126/271 |

*Primary Examiner*—Kenneth W. Sprague
*Assistant Examiner*—James C. Yeung
*Attorney, Agent, or Firm*—Warren F. B. Lindsley

[57] ABSTRACT

An improved solar energy collector and converter comprising a plurality of elongated reflectors mounted for movement each around a heating tube arranged in the linear focus of the reflectors and linked to a tracking mechanism which causes the reflector to be trained toward the location of the sun so that it receives a maximum amount of solar energy.

4 Claims, 6 Drawing Figures

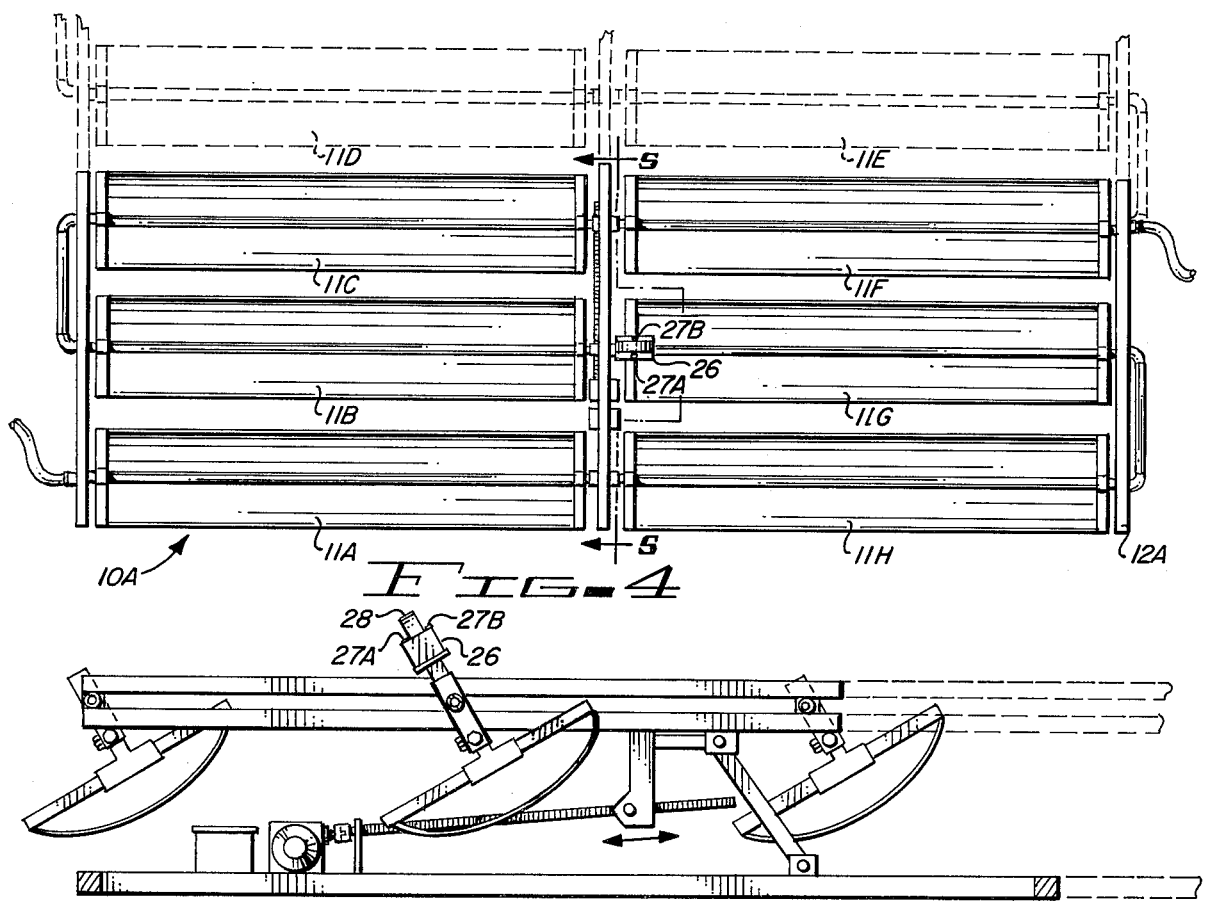
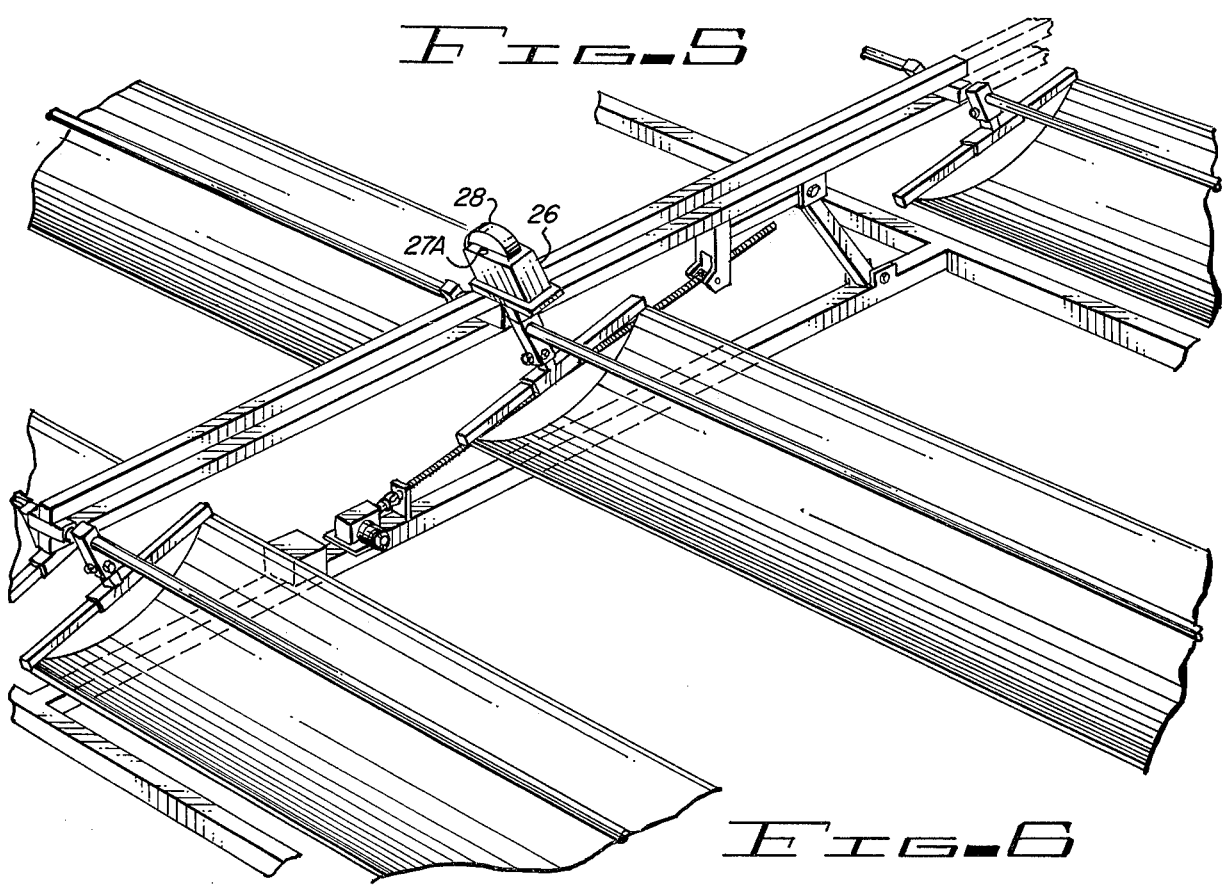

SOLAR ENERGY CONVERTER

BACKGROUND OF THE INVENTION

In recent years the rapid expansion of the world's population coupled with the accelerated technological development of large sectors of the world has produced a dramatic increase in the demand for energy in all forms including fuels and electricity for heating, lighting, transportation and manufacturing processes. The construction of hydroelectric facilities and the development of fossil fuel resources has continued at a rapid rate, but it becomes increasingly evident for a number of reasons that these efforts are inadequate to keep pace with the demands of the growing population.

A first difficulty is the limited availability of fuels such as oil and natural gas. Most countries in the world today do not have adequate sources of these fuels within their own boundaries and are dependent upon foreign sources, notably the Middle East countries for supply. Such a dependence can and does have undesirable effects on the economies of the countries involved and political complications often result. There are also limited sites available that are appropriate for hydroelectric installations.

In the United States there are a number of fossil fuels available such as high-sulphur coal and oil shale, but the development and use of these resources has been complicated by economic and environmental concerns which rule against the use of these resources for a number of reasons including the destructive effects of strip mining, atmospheric contamination due to the high sulphur content of the coal, the cost of extracting the oil from the shale, etc.

More recently, the hope that nuclear power would soon lead to a rapid solution of the energy dilemma has been cooled by delays stemming again from environmental concerns and reservations about the safety of such plants and about the adequacy of plans for handling the radioactive wastes associated with such installations.

In the face of these growing demands and limited resources, there is one source of energy which is readily available to every country in the world in virtually unlimited quantities. This virtually untapped source is solar energy. The World Book Encyclopedia (copyright 1963, USA) states that the amount of solar energy reaching the earth in one day equals the energy that could be produced by burning 550,000,000,000 tons of coal — as much coal as would be dug in the United States in 1000 years at the 1963 rate of mining. It further states that enough solar energy reaches the United States in 20 minutes to fill the country's entire power needs for 1 year.

The interest in this almost boundless resource and in its development and harnessing for use in homes and factories is rising as other resources dwindle. Its desirability is further enhanced by the fact that solar energy may be converted to practical use without the hazard of environmental contamination.

PRIOR ART

Until recently the development of solar energy collectors has been associated for the most part with programs involving military and space applications while only limited attention has been given to broad consumer use. As a result, there is a great potential for improvements in existing collection devices that will result in reduced manufacturing costs and improved thermal efficiencies.

One such device known as a flat plate collector is described by the World Book Encyclopedia (copyright 1963). It is made of metal and glass with one or more layers of glass laid over a blackened metal plate. Air spaces are provided between the layers of glass. Air or water passes through tubes under the metal plate to remove the collected thermal energy. The layers of glass in cooperation with the blackened metal plate act as a heat trap, letting in the sun's rays but keeping most of the heat from escaping again.

A major disadvantage of the flat plate collector is that it must be very large in order to collect sufficient energy, the large size resulting in part from the fact that except for brief periods during the day its surface is not perpendicular to the rays of the sun.

A second disadvantage is that the flat plate collector does not permit the concentration of solar energy at a localized point as needed for the most effective heating of the water and the conversion of water to steam such as required in certain solar-to-electrical conversion processes.

Parabolic reflectors have been utilized in the past along with sun-tracking mechanisms in connection with various schemes for the collection, conversion and utilization of solar energy. Variations of such equipment are described in U.S. Pat. Nos. 495,163 (Apr. 11, 1893); 787,145 (Apr. 11, 1905); 820,127 (May 8, 1906); and 3,713,727 (Jan. 30, 1973).

Heretofore, heat exchangers, particularly of the type adapted to collect cold or heat have been constructed either with a series of tubes imbedded in a flat reflective surface or have comprises a curved or semi-cylindrical reflector with a round tube mounted at approximately its focal point with U.S. Pat. Nos. 1,946,184 (Feb. 6, 1934) and 3,321,012 (May 23, 1967) being representative thereof. Relative to this latter form of the prior art, fins or vanes have been mounted about the tube in an effort to obtain more efficiency from the unit.

Even at best, the prior art heat exchangers have been extremely inefficient even to the point where it is necessary to incorporate thereinto an elaborate system of gears and racks or other means to shift or otherwise change the position of the exchange or collector unit so that its relative position to the source of heat will remain constant.

While such prior art inventions do suggest workable approaches for the realization of the important objectives involved, the particular implementations described in these patents have in general fallen short of what is required in a low-cost and practical system suitable for application and use by the typical homeowner.

SUMMARY OF THE INVENTION

In accordance with the invention claimed, an improved solar energy collector and converter is provided which is compact and inexpensive by virtue of its uniquely designed reflectors and its sun-tracking mechanism.

It is therefore one object of this invention to provide an improved and effective solar energy collector.

Another object of this invention is to provide a compact and inexpensive solar energy collecting means comprising at least one semi-cylindrical reflector having a fluid-heat-transfer tube mounted longitudinally in the radial plane.

A further object of this invention is to provide such an inexpensive solar energy collector which achieves maximum energy collection throughout the day by virtue of its effective yet inexpensive solar tracking mechanism.

A still further object of this invention is to provide a plurality of solar energy parabolic like reflective type collectors mounted in a rack to move in unison with a common stationary fluid heat transfer tube passing through the focal point of each of the collectors adaptable to such applications as home heating, for heating water for swimming pools, and for general home use.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWING

The present invention may be more readily described by reference to the accompanying drawing, in which:

FIG. 4 is a plan view of a bank of collectors of the type shown in FIGS. 1-3 with gearing means for moving all of the collectors in unison under the influence of a sensor;

FIG. 5 is a cross-sectional view of the embodiment shown in FIG. 4 taken along line 5—5;

FIG. 6 is an enlarged partial view of the assembly of FIGS. 4 and 5 showing in more detail the gearing means for moving the collectors in unison.

DESCRIPTION OF THE PREFERRED EMBODIMENT

Figure 1:
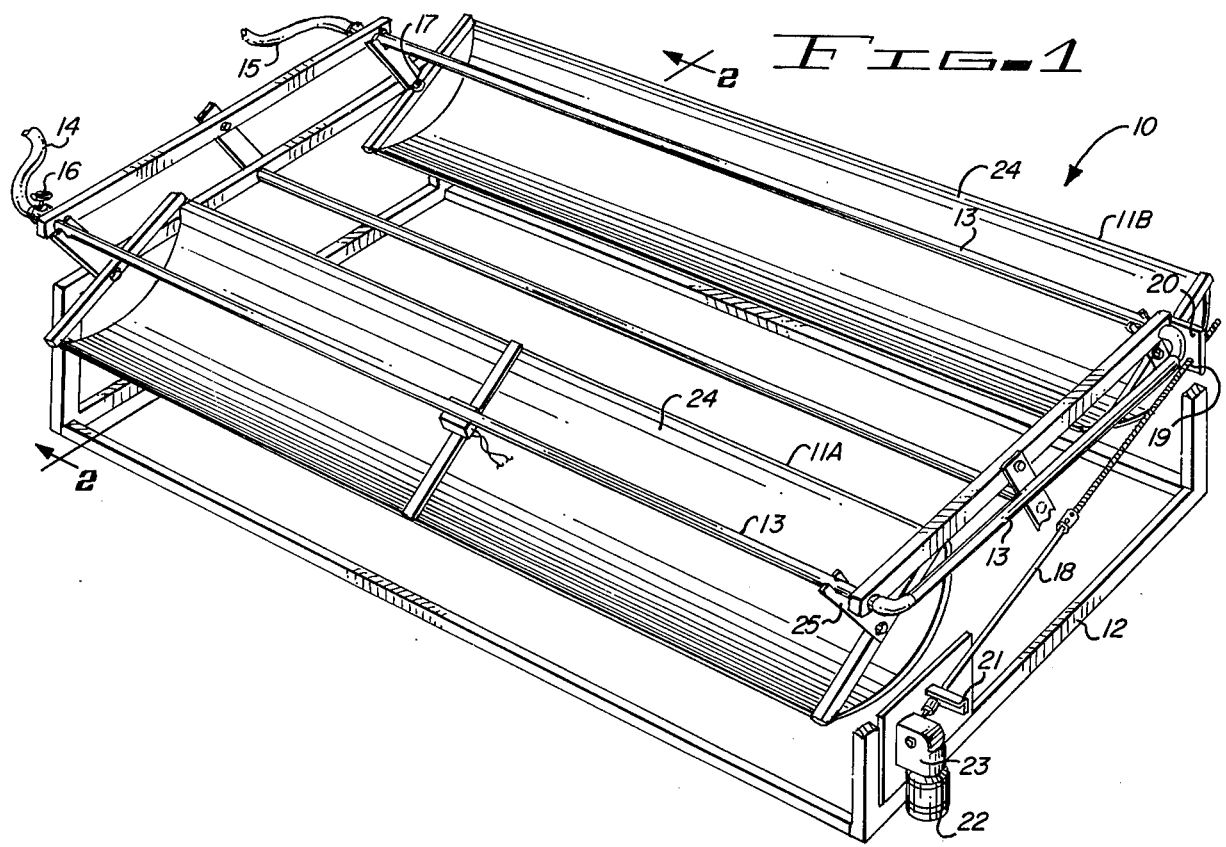
FIG. 1 is a perspective view of a solar energy collector employing means for heating liquid and embodying the invention.
Figure 2:
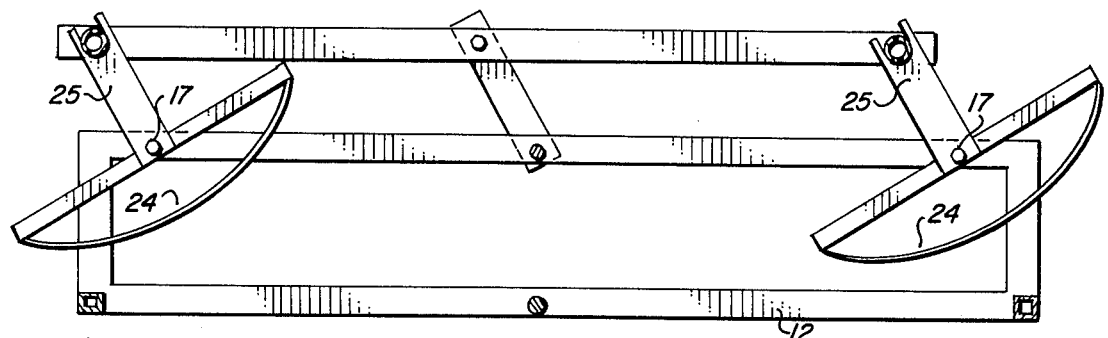
FIG. 2 is a cross sectional view of FIG. 1 taken along the line 2—2.
Figure 3:
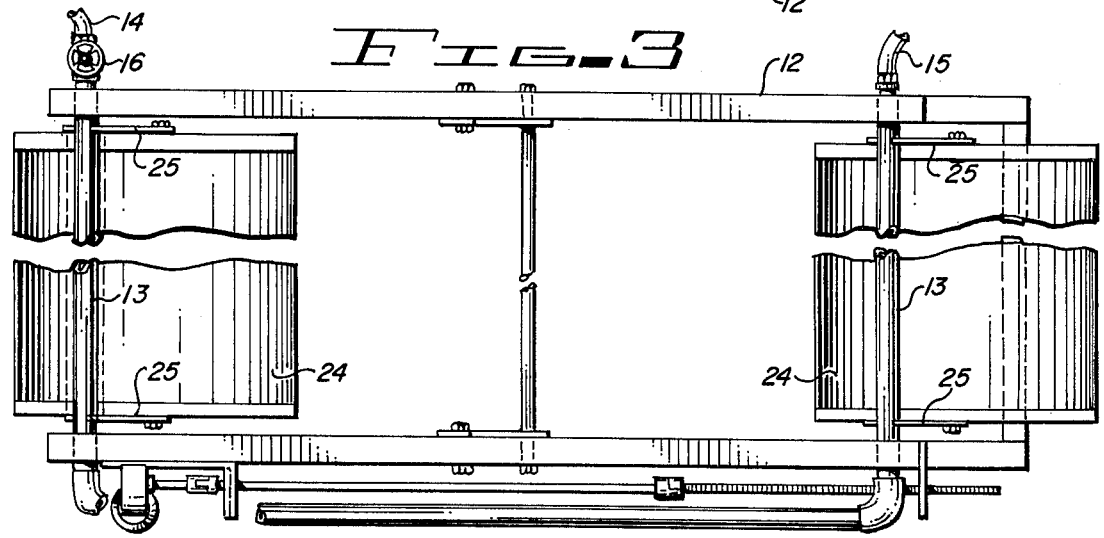
FIG. 3 is a top view of the structure shown in FIG. 1.

Referring more particularly to the drawing by characters of reference, FIGS. 1-3 disclose a heat exchange or solar energy collector 10 comprising one or more pairs of reflectors or reflecting troughs 11A and 11B which may be parallelly arranged in a frame 12 for pivotal movement in unison each about a part of a fluid flow line 13.

The fluid flow line 13 may comprise in part a blackened solar ray absorbing copper tube of about ½ to 1½ inches in diameter comprising, inter alia, portions one of which is arranged along the longitudinal axis of the focus line of the associated curve trough. The portions of the fluid flow line pass through the ends of the associated reflecting trough and are interconnected, as shown in FIG. 1 and comprise an inlet 14 and an outlet 15 which may be controlled by one or more valves 16.

Each reflecting trough is pivotally mounted on the frame at points 17 and are moved in unison by a rod 18 which is threadedly engaged at one end with a thread bore 19 in flange 20 forming a part of frame 12. This rod is also supported at its other end in a bearing flange 21 and driven by an electric motor 22 the rotation speed of its armature being reduced by a step down gear mechanism 23 which, in turn, is connected to rod 18 for rotation thereof at a greatly reduced speed such as a few revolutions per minute.

It should be noted that the reflecting troughs 11A and 11B present a highly reflective surface 24 to the sun having a proper curvature in vertical cross section to bring the sun rays to a focus along a line parallel with the longitudinal axis of the surface of the reflecting trough and coincident with the center of the portion of the flow line 13 passing through it.

For this reason, the reflecting troughs 11A and 11B are mounted on stirrups 25 pivotally mounted on the frame on the ends of the portion of the fluid flow line 13 passing therethrough for rotation around the associated fluid flow line portions.

FIGS. 4-6 disclose an exchanger or collector 10A comprising a bank of the reflecting troughs 11A and 11B shown in FIGS. 1-3 wherein a plurality of reflecting troughs 11A-11H are mounted on a frame 12A in the same manner as disclosed in FIGS. 1-3 will all other similar parts given the same reference characters.

The orientation of the reflecting troughs shown in FIGS. 4-6 preferably lie in a parallel series forming a planar configuration, whose plane is at right angles to the plane of the meridian and preferably, though not necessarily, parallel to the earth's axis. The longer axes of the reflecting troughs are approximately horizontal, and at right angles to the plane of the meridian. The reflecting troughs are rotatable about the axes of the portions of the fluid flow line 13 in the troughs and the several troughs are connected by a link whereby all such reflecting troughs of a series may be rotated simultaneously through an angle of 60° or more or less. The screw shown or equivalent means, is adapted for this purpose. This linkage is so adjusted that 11 the reflecting troughs are oriented similarly with respect to the sun at all times, whatever be the angle of setting by the linkage. A light senser 26 is provided to sense the position of the sun and energize the motor 22 if not properly oriented to timely align the reflecting troughs toward the sun.

By these means all the reflector elements may be properly oriented continually so that the axes of their parabolic cross-sectional curves shall all lie in planes including the center of the sun. Under these circumstances the rays of the sun will continually focus upon the heater tubes independently of the altitude of the sun above the horizon. In such a manner the orientation is accomplished by such simple mechanisms thus far described, requiring only slight and intermittent attention by the senser without the use of elaborate clockwork or costly mechanisms such as are ordinarily used to focus sun rays in astronomical instruments or solar engines.

The heater elements or reflecting troughs are associated in series covering an inclined planar area of 6 by 10 feet more or less, all operated by a single linkage, as above described. Other similar series may be situated adjacent thereto. Thus, large areas, suitable to the collection of immense quantities of solar energy, may be utilized in one power plant.

In operation the present invention may be used for either heating or cooling. When it is desired to collect solar radiations and to transfer the heat thereby accumulated, the heat-transfer fluid within the fluid flow tubes 13 will rise to a predetermined temperature of for example, 180°.

When it is desired to collect cold from the natural climate condition, fluid such as water is circulated through the fluid flow tubes to be cooled by radiation to the colder atmosphere.

It should be noted that the light sensor 26 may comprise any suitable sensing means but may comprise two pairs of light sensing cells 27A, 27B separated by a flange 28 such that when the sun's ray impinge on one cell, such as 27A, the motor 22 will be energized to rotate the reflecting troughs counterclockwise, for example, as shown in FIG. 5, and when the sun's ray impinges on cell 27B, the motor 22 will be energized to rotate troughs clockwise. In this manner, the reflecting troughs will be rotated toward the sun and in proper orientation with the sun to place the portions of the fluid flow line passing through the troughs in the focus line of the reflected rays of the sun.

A salient feature of the solar collector 10 is the special design of the reflector 11. While prior art reflectors were expensive and fragile and thus prohibitive for general home use because of their typical construction using faceted glass mirrors, the present reflector is inexpensively formed from aluminum over a reusable form. Its inside surface may be chrome plated by a special inexpensive process which provides an ideal reflective surface.

It should be recognized that the fluid used in the collector may be water but it could also be a gas such as air under pressure forced through the fluid conducting tube heretofore described. By the use of air under pressure, the possibilities of freeze up in cold weather is eliminated.

It is also within the scope of this invention to utilize a closed fluid system for heat transfer in which the circulated fluid through the reflecting troughs may contain an anti-freeze solution.

In accordance with the stated objects of the invention, a versatile and economically attractive solar energy converter is thus provided and whereas but a few embodiments of the present invention have been illustrated and described, it will be apparent to those skilled in the art that various changes and modifications may be made therein without departing from the spirit of the invention or from the scope of the appended claims.

What is claimed is:

1. An improved heat exchange means comprising:
   a frame,
   at least a pair of juxtapositioned reflectors,
   each of said reflectors comprises a trough having a reflecting surface of a parabolic configuration,
   means for pivotally mounting each of said reflectors in a parallel arrangement on said frame,
   a fluid bearing tube a portion of which is fixedly mounted on said frame longitudinally of each of said reflectors on said frame and approximately disposed with the axis of the portion in the focal zone of an associated reflector outside of its periphery,
   electrical means for moving said reflectors in unison through a similar arc partially around the portion of the tube associated with said reflectors for maintaining said reflectors with the axis of their curvature approximately in a plane containing the sun's center, and
   means for sensing the position of the sun for energizing said electric means for orienting and maintaining said reflectors with their axes of curvature of their inner surfaces approximately in a plane containing the sun's center,
   whereby the reflection of the sun's rays are concentrated by said reflectors in a line image along said portions of said tubes.

2. The improved heat exchange means set forth in claim 1 wherein:
   said means for sensing the position of the sun is mounted on said means for pivotally mounting said reflectors so as to move with said reflectors in an arcuate path.

3. The improved heat exchange means set forth in claim 1 wherein:
   said reflectors are each suspended from and rotatable around the portion of said tube associated therewith.

4. The improved heat exchange means set forth in claim 2 wherein:
   said sensing means comprises a pair of isolated sensors each controlling the movement of said reflectors in a different direction around said path.

* * * * *